US012658451B2

(12) United States Patent
Ahn et al.

(10) Patent No.: US 12,658,451 B2
(45) Date of Patent: Jun. 16, 2026

(54) NEGATIVE ELECTRODE FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Won-Gi Ahn, Yongin-si (KR); Juhye Bae, Yongin-si (KR); Junhong Lee, Yongin-si (KR); Min-young Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/359,047

(22) Filed: Jun. 25, 2021

(65) Prior Publication Data

US 2021/0408551 A1 Dec. 30, 2021

(30) Foreign Application Priority Data

Jun. 26, 2020 (KR) ........................ 10-2020-0078577
May 26, 2021 (KR) ........................ 10-2021-0067755

(51) Int. Cl.
*H01M 4/66* (2006.01)
*H01M 4/02* (2006.01)
*H01M 10/0525* (2010.01)

(52) U.S. Cl.
CPC ........... *H01M 4/663* (2013.01); *H01M 4/661* (2013.01); *H01M 10/0525* (2013.01); *H01M 2004/027* (2013.01)

(58) Field of Classification Search
CPC ...... H01M 4/133; H01M 4/362; H01M 4/364; H01M 4/366; H01M 4/386; H01M 4/583; H01M 4/587
See application file for complete search history.

(56) References Cited

U.S. PATENT DOCUMENTS

2015/0280221 A1 10/2015 Abdelsalam et al.
2016/0013481 A1 1/2016 Jeong et al.
2016/0204428 A1 7/2016 Sugawara
(Continued)

FOREIGN PATENT DOCUMENTS

CN 105742613 A 7/2016
CN 106560943 A 4/2017
(Continued)

OTHER PUBLICATIONS

CN-110993891-A English machine translation (Year: 2023).*
(Continued)

*Primary Examiner* — Armindo Carvalho, Jr.
(74) *Attorney, Agent, or Firm* — Womble Bond Dickinson (US) LLP

(57) ABSTRACT

A negative electrode for a rechargeable lithium battery includes a current collector and a negative active material layer on the current collector, wherein the negative active material layer includes a first region adjacent to the current collector and a second region not in contact with the current collector, the negative active material layer includes a carbonaceous material and a Si-based material including Si, and an amount of Si included in the negative active material layer is different in the first region and the second region.

16 Claims, 4 Drawing Sheets

1

(56) References Cited

U.S. PATENT DOCUMENTS

| | | | | |
|---|---|---|---|---|
| 2016/0285081 | A1 | 9/2016 | Matsuno et al. | |
| 2016/0285101 | A1 | 9/2016 | Yoshio et al. | |
| 2016/0359162 | A1 | 12/2016 | Kim et al. | |
| 2017/0133681 | A1 | 5/2017 | Ko et al. | |
| 2018/0026257 | A1 | 1/2018 | Oh et al. | |
| 2018/0219216 | A1 | 8/2018 | Choi et al. | |
| 2018/0287145 | A1 | 10/2018 | Lee et al. | |
| 2019/0123356 | A1 | 4/2019 | Ko et al. | |
| 2019/0252673 | A1 | 8/2019 | Cha et al. | |
| 2019/0305375 | A1* | 10/2019 | Uehara | H01M 10/0569 |
| 2019/0355971 | A1 | 11/2019 | Kim | |
| 2020/0067078 | A1 | 2/2020 | Son et al. | |
| 2020/0176758 | A1 | 6/2020 | Oh et al. | |
| 2020/0220156 | A1 | 7/2020 | Shin et al. | |
| 2020/0243848 | A1 | 7/2020 | Kim et al. | |
| 2020/0365878 | A1 | 11/2020 | Ishikawa et al. | |
| 2020/0365881 | A1 | 11/2020 | Tanaka et al. | |
| 2020/0403231 | A1 | 12/2020 | Kim et al. | |
| 2021/0013496 | A1 | 1/2021 | Tsuzuki et al. | |
| 2021/0075015 | A1 | 3/2021 | Lee et al. | |
| 2021/0083273 | A1 | 3/2021 | Song et al. | |
| 2021/0091378 | A1 | 3/2021 | Du et al. | |
| 2021/0119200 | A1 | 4/2021 | Nam | |
| 2021/0399290 | A1* | 12/2021 | Li | H01M 4/587 |
| 2022/0131154 | A1 | 4/2022 | Luo et al. | |
| 2022/0173381 | A1* | 6/2022 | Sakamoto | H01M 4/62 |
| 2022/0255059 | A1 | 8/2022 | Sung et al. | |

FOREIGN PATENT DOCUMENTS

| | | | | |
|---|---|---|---|---|
| CN | 107528044 | A | 12/2017 | |
| CN | 110504420 | A | 11/2019 | |
| CN | 110993891 | A * | 4/2020 | H01M 10/0525 |
| CN | 111033823 | A | 4/2020 | |
| CN | 111261834 | A | 6/2020 | |
| CN | 111799451 | A | 10/2020 | |
| JP | 2015-537347 | A | 12/2015 | |
| JP | 2016-181331 | A | 10/2016 | |
| JP | 2018-56066 | A | 4/2018 | |
| JP | 2018-63920 | A | 4/2018 | |
| JP | 2019-71224 | A | 5/2019 | |
| JP | 2019-179724 | A | 10/2019 | |
| JP | 2020-13754 | A | 1/2020 | |
| JP | 2020-509541 | A | 3/2020 | |
| KR | 10-2016-0062025 | A | 6/2016 | |
| KR | 10-2017-0054839 | A | 5/2017 | |
| KR | 10-2017-0107213 | A | 9/2017 | |
| KR | 10-2017-0111746 | A | 10/2017 | |
| KR | 10-2018-0004587 | A | 1/2018 | |
| KR | 10-2018-0010534 | A | 1/2018 | |
| KR | 10-2019-0065172 | A | 6/2019 | |
| KR | 10-2019-0074999 | A | 6/2019 | |
| KR | 10-2019-0096649 | A | 8/2019 | |
| KR | 10-2019-0122417 | A | 10/2019 | |
| KR | 10-2019-0124520 | A | 11/2019 | |
| KR | 10-2020-0018148 | A | 2/2020 | |
| KR | 10-2020-0021787 | A | 3/2020 | |
| KR | 10-2020-0038168 | A | 4/2020 | |
| KR | 10-2020-0056206 | A | 5/2020 | |
| KR | 10-2519116 | B1 | 4/2023 | |
| WO | 2015/045385 | A1 | 4/2015 | |
| WO | 2019/131195 | A1 | 7/2019 | |
| WO | 2019/187537 | A1 | 10/2019 | |

OTHER PUBLICATIONS

Extended European Search Report for EP Application No. 21209319.9 dated Apr. 14, 2022, 9 pages.

EPO Extended European Search Report dated Nov. 18, 2021, issued in corresponding European Patent Application No. 21182169.9 (7 pages).

Japanese Office Action dated Jul. 11, 2022, issued in corresponding Japanese Patent Application No. 2021-106546 (4 pages).

Japanese Office Action dated Dec. 23, 2022, issued in Japanese Patent Application No. 2021-188031 (5 pages).

Chinese Office Action for CN Application No. 202110717429.2 dated Dec. 15, 2023, 19 pages.

Chinese Office Action for CN Application No. 202111367862.4 dated Dec. 18, 2023, 15 pages.

Office Action for U.S. Appl. No. 17/455,562 dated Dec. 4, 2023, 30 pages.

Office Action for U.S. Appl. No. 18/110,237 dated Feb. 13, 2024, 10 pages.

Korean Office Action dated Dec. 5, 2024, issued in Korean Patent Application No. 10-2021-0067755 (7 pages).

US Office Action date Sep. 5, 2024, issued in U.S. Appl. No. 17/455,562 (10 pages).

US Final Office Action date Sep. 28, 2024, issued in U.S. Appl. No. 18/110,237 (10 pages).

US Final Office Action dated Jun. 6, 2024, issued in U.S. Appl. No. 17/455,562 (9 pages).

US Office Action dated Jan. 14, 2025, issued in U.S. Appl. No. 17/455,562 (9 pages).

Korean Office Action corresponding to KR Application No. 10-2020-0155918, dated May 27, 2025 (8 pages).

US Office Action dated Jun. 30, 2025, issued in U.S. Appl. No. 18/110,237 (10 pages).

U.S. Final Office Action dated Sep. 3, 2025, issued in U.S. Appl. No. 17/455,562 (10 pages).

U.S. Final Office Action dated Oct. 22, 2025, issued in U.S. Appl. No. 18/110,237 (8 pages).

U.S. Office Action dated Mar. 4, 2026, issued in U.S. Appl. No. 17/455,562 (11 pages).

US Office Action dated Mar. 31, 2026, issued in U.S. Appl. No. 18/110,237 (10 pages).

Korean Notice of Allowance dated Apr. 15, 2026, issued in corresponding Korean Patent Application No. 10-2021-0067755 (3 pages).

* cited by examiner

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATIONS

This application claims priority to and the benefit of Korean Patent Application No. 10-2020-0078577, filed in the Korean Intellectual Property Office on Jun. 26, 2020, and Korean Patent Application No. 10-2021-0067755, filed in the Korean Intellectual Property Office on May 26, 2021, the entire content of each of which is incorporated herein by reference.

BACKGROUND

1. Field

One or more aspects of embodiments of the present disclosure relate to a negative electrode for a rechargeable lithium battery and a rechargeable lithium battery including the same.

2. Description of the Related Art

Because the use of electronic devices utilizing batteries (such as mobile phones, notebook computers, and/or electric vehicles) is rapidly increasing, the demand for small and lightweight rechargeable lithium batteries with relatively high capacity has abruptly increased. Because rechargeable lithium batteries are light in weight and have high energy density, they have drawn attention as a power source for portable-electronic devices. Thus, technology for improving performance of rechargeable lithium batteries is being actively developed.

A rechargeable lithium battery includes an electrolyte between positive and negative electrodes with active materials being capable of intercalating and deintercalating lithium ions, and generates electrical energy (e.g., current) by oxidation and reduction reactions when lithium ions are intercalated/deintercalated in the positive and negative electrodes.

For positive active materials for the rechargeable lithium battery, transition metal compounds (such as a lithium cobalt oxide, a lithium nickel oxide, a lithium manganese oxide, etc.), are mainly utilized. As negative active materials, crystalline carbonaceous materials (such as natural graphite and/or artificial graphite), and/or amorphous carbonaceous materials, are utilized.

The information disclosed in this Background section is only for enhancement of understanding of the background of the present disclosure, and therefore it may contain information that is not prior art to a person of ordinary skill in the art.

SUMMARY

One or more aspects of embodiments of the present disclosure are directed toward a negative electrode for a rechargeable lithium battery exhibiting excellent or suitable battery performance and/or cycle-life characteristics.

One or more aspects of embodiments of the present disclosure are directed toward a rechargeable lithium battery including the negative electrode.

One or more embodiments of the present disclosure provide a negative electrode for a rechargeable lithium battery, including a current collector and a negative active material layer on the current collector, wherein the negative active material layer includes a first region adjacent to the current collector and a second region not contacting (e.g., not in contact with) the current collector, the negative active material layer includes a carbonaceous (carbon-based) material and a Si-based material including Si, and an amount of Si included in the negative active material layer is different in the first region and the second region.

The amount of Si may be present with a concentration gradient increasing from the second region to the first region.

In one embodiment, an amount (e.g., total amount) of the Si included in the first region may be about 2 times to about 25 times the amount (e.g., total amount) of the Si included in the second region.

The carbonaceous material may be crystalline carbon, and the crystalline carbon may be artificial graphite, natural graphite, or a combination thereof.

The Si-based material may include a composite with Si particles and a first carbon-based material.

In one embodiment, the Si-based material may include a core in which the Si particle(s) and a second carbon-based material are mixed, and a third carbon-based material around (e.g., surrounding) on the core.

The first region may be a region corresponding to about 1% of the total thickness of the negative active material layer to about 75% of the total thickness of the negative active material layer.

One or more embodiments of the present disclosure provide a rechargeable lithium battery including the negative electrode, a positive electrode, and an electrolyte.

The negative electrode according to one embodiment may exhibit good or suitable cycle-life characteristics, and good or suitable storage characteristics at a high temperature.

DETAILED DESCRIPTION

Hereinafter, embodiments of the present disclosure are described in more detail. However, these embodiments are examples, the present disclosure is not limited thereto, and the present disclosure is defined by the scope of claims.

As used herein, singular forms such as “a,” “an,” and “the” are intended to include the plural forms as well, unless the context clearly indicates otherwise. It will be further understood that the terms “includes,” “including,” “comprises,” and/or “comprising,” when used in this specification, specify the presence of stated features, steps, operations, elements, and/or components, but do not preclude the presence or addition of one or more other features, steps, operations, elements, components, and/or groups thereof.

As used herein, the terms "use," "using," and "used" may be considered synonymous with the terms "utilize," "utilizing," and "utilized," respectively. Expressions such as "at least one of," "one of," and "selected from," when preceding a list of elements, modify the entire list of elements and do not modify the individual elements of the list. The term "and/or" includes any and all combinations of one or more of the associated listed items. Further, the use of "may" when describing embodiments of the present disclosure refers to "one or more embodiments of the present disclosure".

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

A negative electrode for a rechargeable lithium battery according to one embodiment includes a current collector and a negative active material layer on the current collector, and the negative active material layer includes a first region adjacent to the current collector and a second region not contacting (e.g., not in contact with) the current collector. The negative active material layer includes a carbonaceous material and a Si-based material including silicon (Si), and an amount of Si included in the negative active material layer may be different in the first region and the second region (e.g., the amount of Si included in the first region may be different from the amount of Si included in the second region).

Figure 1:
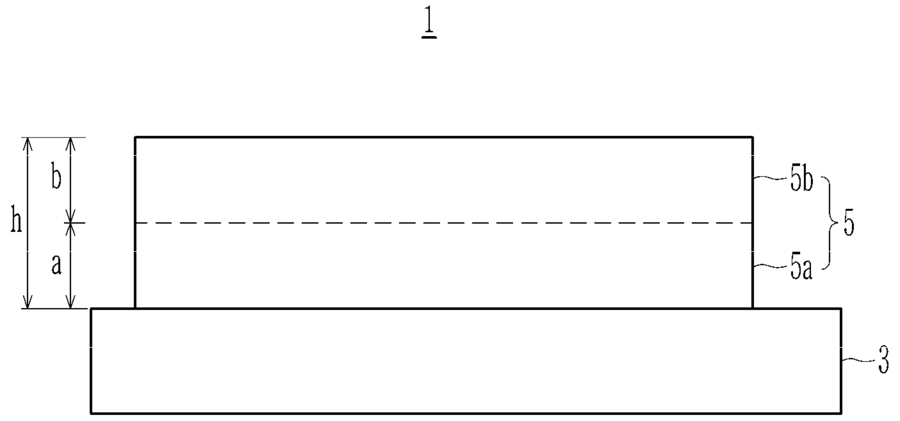
FIG. 1 is a schematic view showing a structure of the negative electrode for a rechargeable lithium battery according to an embodiment.

Referring to FIG. 1, the negative electrode 1 according to one embodiment includes a current collector 3 and a negative active material layer 5, and a first region 5*a* adjacent to the current collector 3 and a second region 5*b* not adjacent to the current collector 3.

The first region may be a region corresponding to about 1% of the total thickness of the negative active material layer to about 75% of the total thickness of the negative active material layer. According to one embodiment, the first region may be a region of about 1% of the total thickness of the negative active material layer to about 50% of the total thickness of the negative active material layer. For example, the first region may be a region corresponding to a minimum of about 1% thickness, and a region corresponding to a maximum of about 75% thickness, and in one embodiment, a maximum of about 50% thickness, when the total thickness of the negative active material layer is set to about 100%.

Furthermore, the thickness of the first region may be about 1% or more of the total thickness of the negative active material layer, and about 75% or less of the total thickness of the negative active material layer. As shown in FIG. 1, the thickness (a) of the first region may be a minimum of about 1% based on the total thickness (h), and a maximum of about 75%, and in one embodiment, a maximum of about 50%. The second region 5*b* may have a corresponding thickness (b) having a minimum of about 25% based on the total thickness (h), and a maximum of about 99%, and in one embodiment, a maximum of about 50%. In some embodiments, the second region 5*b* may be directly on or over the first region 5*a*, and the first region 5*a* may be directly on or over the current collector 3.

An amount of Si included in the negative active material layer may be different in the first region and the second region. For example, the amount (e.g., total amount) of Si included in the first region may be different from that (e.g., total amount) of Si included in the second region. According to one embodiment, the Si may be present with a concentration gradient (e.g., a continuous concentration gradient or a non-continuous concentration gradient) that increases from the second region to the first region, and the amount of Si included in the first region may be about 2 times to about 25 times the amount of Si included in the second region. For example, the amount (e.g., total amount) of Si included in the first region may be larger by about 2 times to about 25 times than the amount (e.g., total amount) of Si included in the second region. According to another embodiment, the amount of Si included in the negative active material layer may be increased by about 5 wt % to about 8 wt % for each region (e.g., distance of thickness increment) corresponding to a thickness of about 25% in a direction (e.g., along a vector) from the outermost (top) edge of the second region toward the first region.

When the amount of Si is increased under the above condition, an expansion of the active material layer during charge and discharge may be effectively suppressed or reduced and/or cycle-life characteristics may be improved.

As such, the amount of Si is different in (between) the first region and the second region, for example, a lower region and an upper region, and particularly, the amount of Si in the second region is smaller than the amount of Si in the first region. According to one embodiment, because the amount of Si is present with a concentration gradient that increases in a direction from (along) the second region to the first region, resistance (e.g., battery resistance and/or material layer resistance) may be reduced, and thus, the high-rate charge and discharge characteristics and the cycle-life characteristics may be improved.

Such effects may be more effectively exhibited when the amount of Si included in the first region is about 2 times to 25 times the amount of Si included in the second region.

Even though the amount of Si is different in the first region and the second region, if the amount of Si in the second region is larger than the amount of Si in the first region, improvement effects for the high-rate charge and discharge characteristics and cycle-life characteristics may not be realized, as the high Si in the second region causes resistance to increase, and thereby deteriorates initial characteristics.

The amount of Si in the negative active material layer may be about 1 wt % to about 25 wt % based on the total weight of the negative active material layer. When the amount of Si falls into the range, the capacity per volume of the battery may be improved.

The carbonaceous material may be crystalline carbon, and may be artificial graphite, natural graphite, or a combination thereof.

In the negative active material layer, a mixing ratio (mixing weight ratio) of the carbonaceous material and the Si-based material may be about 0.1:100 parts by weight to about 2000:100 parts by weight. When the mixing ratio of the carbonaceous material and the Si-based material is included in the above-described range in the negative active material layer, the volume expansion of the silicon (e.g., during charging) may be effectively suppressed or reduced, and good or suitable conductivity may be obtained.

In one embodiment, the Si-based material may include a composite with Si particles and a first carbon-based material. The first carbon-based material may be or include amorphous carbon and/or crystalline carbon. Examples of the composite may include a core in which Si particles are mixed with a second carbon-based material, and a third carbon-based material surrounding the core. The second carbon-based material and the third carbon-based material may be the same as or different from each other, and may each independently be amorphous carbon and/or crystalline carbon.

The amorphous carbon may be pitch carbon, soft carbon, hard carbon, mesophase pitch carbide, sintered cokes, carbon fiber, or a combination thereof, and the crystalline carbon may be artificial graphite, natural graphite, or a combination thereof.

A particle diameter of the Si particle may be about 10 nm to about 30 μm, and according to one embodiment, may be about 10 nm to about 1000 nm, and according to another embodiment, may be about 20 nm to about 150 nm. When the particle diameter of the Si particle is within the above-described range, the volume expansion caused during the charge and discharge may be suppressed or reduced, and disconnection (e.g., loss) of a conductive path (e.g., for $Li^+$ ions) due to particle breakage during the charge and discharge may be prevented or reduced.

In the specification, a particle diameter may be an average particle diameter of particles. Herein, the average particle diameter may be a particle diameter (D50) value obtained from measuring a cumulative particle volume (e.g., size) distribution. Unless otherwise defined in the specification, the term "average particle diameter (D50") refers to a diameter of particles having a cumulative volume of 50% in a cumulative distribution of particle size.

The average particle size D50 may be measured by techniques that are well known to those ordinarily skilled in the art, for example, by using a particle size analyzer, transmission electron microscope (TEM) photography, or scanning electron microscope (SEM) photography. Another method may be performed by utilizing a measuring device with dynamic light scattering, analyzing data to count a number of particles relative to each particle size, and then calculating to obtain an average particle diameter D50.

When the Si-based material includes Si particles and the first carbon-based material, an amount of the Si-based material may be about 30 wt % to about 70 wt %, and in one embodiment, may be about 40 wt % to about 50 wt %. An amount of the first carbon-based material may be about 70 wt % to about 30 wt %, and in one embodiment, about 50 wt % to about 60 wt %. When the amounts of the Si particle and the first carbon-based material satisfy the above-described ranges, a high-capacity characteristic may be obtained.

When the Si-based material includes a core in which Si particles and a second carbon-based material are mixed together, and a third carbon-based material around (e.g., surrounding) the core, the third carbon-based material may be present at (e.g., a layer of the third carbon-based material may have) a thickness of about 5 nm to about 100 nm. Furthermore, an amount of the third carbon-based material may be about 1 wt % to about 50 wt % based on the total amount of 100 wt % of the Si-based material, an amount of the Si particle may be about 30 wt % to about 70 wt % based on the total amount of 100 wt % of the Si-based material, and an amount of the second carbon-based material may be about 20 wt % to about 69 wt % based on the total of 100 wt % of the Si-based material. When the amounts of the Si particle, the third carbon-based material, and the second carbon-based material satisfy the above-described ranges, discharge capacity may be excellent or suitable and the capacity retention may be improved.

The negative active material layer may include a binder, and may further optionally include a conductive material.

An amount of the negative active material may be about 95 wt % to about 99 wt % based on the total amount of the negative active material layer.

An amount of the binder may be about 1 wt % to about 5 wt % based on the total weight of the negative active material layer. When the conductive material is further included, the negative active material layer may include about 90 wt % to about 98 wt % of the negative active material, about 1 wt % to about 5 wt % of the binder, and about 1 wt % to about 5 wt % of the conductive material.

The binder may facilitate adherence of the negative active material particles to each other and to the current collector. The binder may include a non-water-soluble binder, a water-soluble binder, or a combination thereof.

The non-water-soluble binder may be ethylene propylene copolymer, polyacrylonitrile, polystyrene, polyvinyl chloride, carboxylated polyvinyl chloride, polyvinylfluoride, polyurethane, polytetrafluoroethylene, polyvinylidene fluoride, polyethylene, polypropylene, polyamideimide, polyimide, lithium polyacrylate, or a combination thereof.

The water-soluble binder may be a styrene-butadiene rubber (SBR), an acrylated styrene-butadiene rubber (ABR), an acrylonitrile-butadiene rubber, an acryl rubber, a butyl rubber, a fluorine rubber, an ethylene oxide-including polymer, polyvinyl pyrrolidone, polypropylene, polyepichlorohydrin, polyphosphazene, an ethylene propylene copolymer, polyvinyl pyridine, chlorosulfonate polyethylene, latex, a polyester resin, an acryl resin, a phenol resin, an epoxy resin, polyvinyl alcohol, or a combination thereof.

When a water-soluble binder is utilized as a negative electrode binder, a cellulose-based compound may be further utilized as a thickener to provide or increase viscosity. The cellulose-based compound may include one or more of carboxymethyl cellulose, hydroxypropyl methyl cellulose, methyl cellulose, or alkali metal salts thereof. The alkali metals of the alkali metal salts may be sodium (Na), potassium (K), or lithium (Li). The thickener may be included in an amount of about 0.1 parts by weight to about 3 parts by weight based on 100 parts by weight of the negative active material.

The conductive material is included to provide electrode conductivity, and any suitable electrically conductive material may be utilized as a conductive material unless it causes an unwanted chemical change. Examples of the conductive material may include a carbon-based material (such as natural graphite, artificial graphite, carbon black, acetylene black, ketjen black, denka black, carbon fiber, and/or the like); a metal-based material of a metal powder and/or a metal fiber including copper, nickel, aluminum, silver, and/or the like; a conductive polymer (such as a polyphenylene derivative); or a mixture thereof.

The current collector may include one selected from a copper foil, a nickel foil, a stainless steel foil, a titanium foil, a nickel foam, a copper foam, a polymer substrate coated with a conductive metal, and combinations thereof, but is not limited thereto.

The negative active material may be prepared by the following procedure.

Two or more (for example, two or more, and four or less) negative active material layer compositions having different Si amounts may be prepared. The two or more negative active material layer compositions may include substantially the same composition (components), except for the amount of Si, and the negative active material layer compositions may include the negative active material, the binder, and optionally the conductive material, and further include solvent. Herein, the negative active material includes a carbon material and a Si-based material including Si, and the mixing ratio (mixing weight ratio) of the carbon material and the Si-based material may be about 0.1:100 to about 2000:100 parts by weight.

When the two negative active material layer compositions are prepared, the amount of Si in a first negative active material composition may be about 10 wt % to about 25 wt % based on the total solid amount of 100 wt % of the first negative active material layer composition, and the amount of Si in a second negative active material composition may be about 1 wt % to about 15 wt % based on the total solid amount, 100 wt %, of the second negative active material layer composition.

Furthermore, when three or more negative active material layer compositions are prepared, the compositions may be prepared by increasing the amount of Si in the negative active material compositions to about 5 wt % to about 8 wt % within a minimum of about 1 wt % and a maximum of about 25 wt % based on the total solid amount, 100 wt %, of the negative active material layer compositions.

The negative active material layer compositions having different Si amounts may be simultaneously (e.g., progressively) coated on a current collector (e.g., on the same current collector), and for example, the first negative active material layer composition and the second negative active material layer composition are simultaneously coated on the current collector, and herein, the coating process may be progressed by directly coating the first negative active material layer composition on the current collector. For example, the first negative active material layer composition may be coated on the current collector, and then the second negative active material layer composition may be coated directly on the first negative active material layer composition, etc. For example, the coating may be performed in order to directly coat the negative active material layer with a high Si amount. Thereafter, drying and compressing may be performed to prepare (e.g., complete preparation of) the negative active material layer.

As such, the negative active material layer compositions having different Si amounts may be simultaneously coated (e.g., coated within the same negative electrode), and thus, the negative active material layer in which the amount of Si in the first region is different from that of Si in the second region may be prepared. The negative active material layer may have a concentration gradient of the amount of Si (e.g., when the distribution of Si throughout the entire layer is considered). When such a negative active material layer having the concentration gradient is prepared utilizing two (e.g., two to four) negative active material compositions, the negative active material layer having the concentration gradient of Si may also be prepared by suitably controlling the conditions for the drying process. For example, the drying process may be controlled or executed so that the Si materials in the different negative active material layer compositions partially diffuse and approach each other in concentration to form a gradient. In the coating process, the thicknesses of the first region and the second region may be controlled or selected by controlling the solid amount and oil pressure of a machine utilized.

The compression may be performed using suitable conditions, as generally understood in the related art.

Another embodiment of the present disclosure provides a rechargeable lithium battery including the negative electrode, a positive electrode, and an electrolyte.

The positive electrode may include a current collector and a positive active material layer formed on the current collector.

The positive active material may include compounds that reversibly intercalate and deintercalate lithium ions (lithiated intercalation compounds). For example, the positive active material may include one or more composite oxides of a metal selected from cobalt, manganese, nickel, and a combination thereof, and lithium. More specific examples may be compounds represented by one of the following chemical formulae. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le a \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_a$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0 \le e \le 0.1$); $Li_aNi_bCo_cAl_dG_eO_2$ ($0.90 \le a \le 1.8$, $0 \le b \le 0.9$, $0 \le c \le 0.5$, $0 \le d \le 0.5$, $0 \le e \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}(PO_4)_3$ ($0 \le f \le 2$); $Li_{(3-f)}Fe_2(PO_4)_3$ ($0 \le f \le 2$); and/or $Li_aFePO_4$ ($0.90 \le a \le 1.8$).

In the chemical formulae, A is selected from nickel (Ni), cobalt (Co), manganese (Mn), and a combination thereof; X is selected from aluminum (Al), Ni, Co, Mn, chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from Co, Mn, and combinations thereof; T is selected from fluorine (F), sulfur (S), phosphorus (P), and combinations thereof; G is selected from Al, Cr, Mn, Fe, Mg, lanthanum (La), cerium (Ce), Sr, V, and combinations thereof; Q is selected from titanium (Ti), molybdenum (Mo), Mn, and combinations thereof; Z is selected from Cr, V, Fe, scandium (Sc), yttrium (Y), and combinations thereof; and J is selected from V, Cr, Mn, Co, Ni, copper (Cu), and combinations thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous and/or crystalline. The coating element included in the coating layer may include Mg, Al, Co, K, Na, Ca, Si, Ti, V, tin (Sn), germanium (Ge), gallium (Ga), boron (B), arsenic (As), zirconium (Zr), or a mixture thereof. The coating layer may be disposed utilizing a method having no adverse influence on the properties of the positive active material (e.g., as caused by the elements in the compound). For example, the method may include any suitable coating method (such as spray coating, dipping, and/or the like), in the related art.

In the positive electrode, an amount of the positive active material may be 90 wt % to 98 wt % based on the total weight of the positive active material layer.

In one embodiment, the positive active material layer may further include a binder and a conductive material. Herein, the amounts of the binder and the conductive material may each be about 1 wt % to about 5 wt % based on a total amount of the positive active material layer.

The binder improves binding properties of the positive active material particles with one another and with a current collector. Examples of the binder may include polyvinyl alcohol, carboxymethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material is included to provide electrode conductivity. Any suitable electrically conductive material may be utilized as a conductive material unless it causes an unwanted chemical change in a battery. Examples of the conductive material may include a carbon-based material (such as natural graphite, artificial graphite, carbon black, acetylene black, ketjen black, carbon fiber, and/or the like); a metal-based material of a metal powder and/or a metal fiber including copper, nickel, aluminum, silver, and/or the like; a conductive polymer (such as a polyphenylene derivative); or a mixture thereof.

The current collector may be an aluminum foil, a nickel foil, or a combination thereof, but is not limited thereto.

The electrolyte may include a non-aqueous organic solvent and a lithium salt.

The non-aqueous organic solvent serves as a medium for transmitting the ions (e.g., $Li^+$ ions) taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, t-butyl acetate, methyl propionate, ethyl propionate, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethyl alcohol, isopropyl alcohol, and/or the like, and the aprotic solvent may include nitriles (such as R-CN, wherein R is a hydrocarbon group having a C2 to C20 linear, branched, or cyclic structure and may include a double bond, an aromatic ring, or an ether bond, and/or the like), dioxolanes (such as 1,3-dioxolane and/or the like), and sulfolanes and/or the like.

The non-aqueous organic solvent may be utilized alone or in a mixture. When the organic solvent is utilized in a mixture, the mixture ratio may be controlled or selected in accordance with a desirable battery performance.

The carbonate-based solvent may include a mixture with a cyclic carbonate and a linear (chain) carbonate. The cyclic carbonate and linear carbonate may be mixed together in a volume ratio of 1:1 to 1:9, which may provide enhanced performance of an electrolyte.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1:

Chemical Formula 1

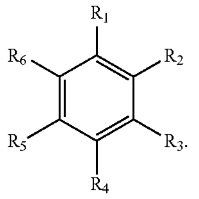

In Chemical Formula 1$R_1$ to $R_6$ may each independently be the same or different and may be selected from hydrogen, a halogen, a C1 to C10 alkyl group, a haloalkyl group, and a combination thereof.

Non-limiting examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and/or combinations thereof.

The electrolyte may further include vinylene carbonate and/or an ethylene carbonate-based compound as represented by Chemical Formula 2 as an additive for improving battery cycle-life:

Chemical Formula 2

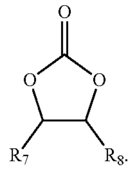

In Chemical Formula 2$R_7$ and $R_8$ may each independently be the same or different, and are selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not both (e.g., simultaneously) hydrogen.

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and/or the like. When such an additive for improving cycle-life is further utilized, the amount may be controlled or selected within an appropriate or suitable range.

The lithium salt dissolved in an organic solvent supplies a battery with lithium ions, basically operates the rechargeable lithium battery, and improves transportation of lithium ions between the positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example an integer of 1 to 20), LiCl, LiI, and $LiB(C_2O_4)_2$ (lithium bis(oxalato) borate; LiBOB). A concentration of the lithium salt may range from 0.1 M to 2.0 M. When the lithium salt is included at the above concentration range, an electrolyte may have excellent or suitable performance and lithium ion mobility due to optimal or suitable electrolyte conductivity and viscosity.

A separator may be disposed between the positive electrode and the negative electrode depending on a type or format of the rechargeable lithium battery. Such a separator may include polyethylene, polypropylene, polyvinylidene fluoride, or two or more multi-layers thereof, and mixed multi-layers thereof (such as a polyethylene/polypropylene double-layered separator, a polyethylene/polypropylene/polyethylene triple-layered separator, or a polypropylene/polyethylene/polypropylene triple-layered separator).

Figure 2:
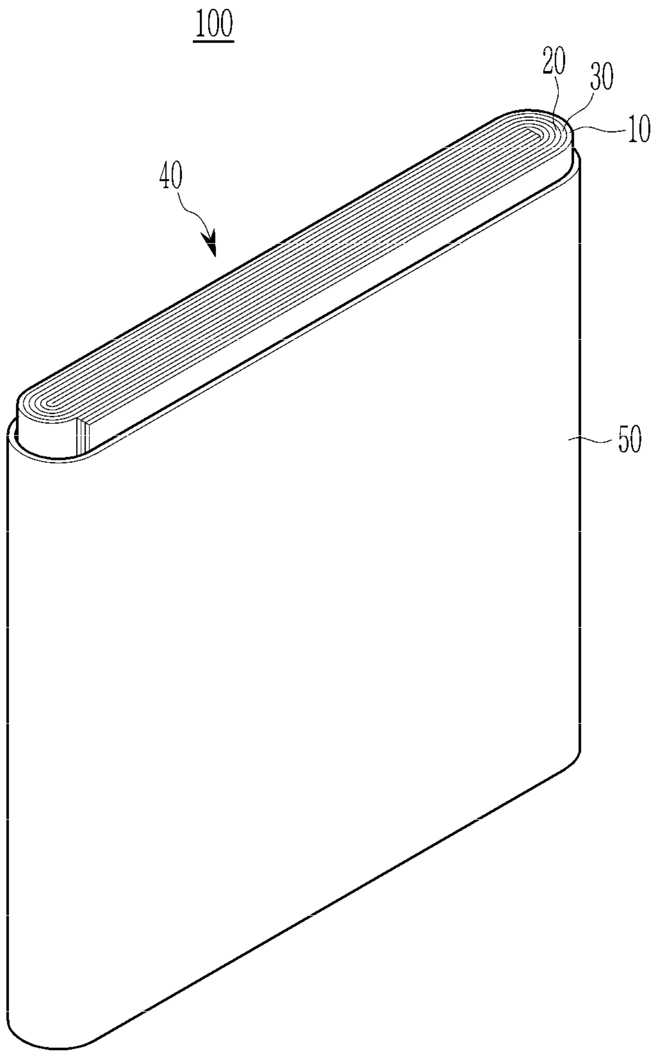
FIG. 2 is a schematic view showing the structure of a rechargeable lithium battery according to an embodiment.

FIG. 2 is an exploded perspective view of a lithium secondary battery according to an embodiment. The lithium secondary battery according to an embodiment is illustrated as a prismatic battery but is not limited thereto, and may be or include variously-shaped batteries (such as a cylindrical battery, a pouch-type or kind battery, and/or the like).

Referring to FIG. 2, a rechargeable lithium battery 100 according to an embodiment includes a wound electrode assembly 40 including a positive electrode 10, a negative electrode 20, and a separator 30 disposed therebetween, and a case 50 housing the electrode assembly 40. The positive electrode 10, the negative electrode 20, and the separator 30 may be impregnated with an electrolyte.

Hereinafter, examples of the present disclosure and comparative examples are described. However, the present disclosure is not limited to examples.

Example 1

Artificial graphite at 87.5 wt %, a Si-based material at 10 wt %, carboxymethyl cellulose at 1.0 wt % and styrene-butadiene rubber at 1.5 wt % were mixed in pure water to prepare a first negative active material layer slurry. Herein, a Si-carbon composite including a core including artificial graphite and silicon particles and a soft carbon coated on the core was utilized as the Si-based material. The soft carbon coating layer had a thickness of about 20 nm, and the silicon particle had an average particle diameter D50 of about 100 nm.

Artificial graphite at 92.5 wt %, a Si-based material at 5 wt %, carboxymethyl cellulose at 1.0 wt % and styrene-butadiene rubber at 1.5 wt % were mixed in pure water to prepare a second negative active material layer slurry. Herein, a Si-carbon composite including a core including artificial graphite and silicon particles and a soft carbon coated on the core was utilized as the Si-based material. The soft carbon coating layer had a thickness of about 20 nm, and the silicon particles had an average particle diameter D50 of about 100 nm.

The first negative active material layer slurry and the second negative active material layer slurry were simultaneously coated on a Cu foil current collector (e.g., the first negative active material layer composition was coated on the Cu foil and the second negative active material layer slurry was coated on the first negative active material), then dried and compressed to prepare a negative active material layer, and finally a negative electrode was fabricated therewith. In the negative active material layer, a region corresponding to about 50% of the total thickness of the negative active material layer, adjacent to the current collector, was classified as a first region, and another region corresponding to the remaining 50%, not adjacent to the current collector, was classified as a second region. In the negative active material layer, an amount (e.g., concentration) of Si present in the first region was twice that of the amount (e.g., concentration) of Si present in the second region. In the entire negative active material layer, the amount of Si was about 7.5 wt % based on the total weight of the negative active material layer.

Using the negative electrode, a lithium metal counter electrode, and an electrolyte solution, a half-cell was fabricated according to methods in the art. As the electrolyte solution, 1.5 M $LiPF_6$ dissolved in a mixed solvent of ethylene carbonate, ethyl methyl carbonate and dimethyl carbonate (30:50:20 volume ratio) was utilized.

Example 2

Artificial graphite at 83.5 wt %, a Si-based material at 14 wt %, carboxymethyl cellulose at 1.0 wt % and styrene-butadiene rubber at 1.5 wt % were mixed in pure water to prepare a first negative active material layer slurry. Herein, a Si-carbon composite including a core including artificial graphite and silicon particles and a soft carbon coated on the core was utilized as the Si-based material. The soft carbon coating layer had a thickness of about 20 nm, and the silicon particles had an average particle diameter D50 of about 100 nm.

Artificial graphite at 96.5 wt %, a Si-based material at 1 wt %, carboxymethyl cellulose at 1 wt % and styrene-butadiene rubber at 1.5 wt % were mixed in pure water to prepare a second negative active material layer slurry. Herein, a Si-carbon composite including a core including artificial graphite and silicon particles and a soft carbon coated on the core was utilized as the Si-based material. The soft carbon coating layer had a thickness of about 20 nm, and the silicon particles had an average particle diameter D50 of about 100 nm.

The first negative active material layer slurry and the second negative active material layer slurry were simultaneously coated on a Cu foil current collector (e.g., the first negative active material layer composition was coated on the Cu foil and the second negative active material layer slurry was coated on the first negative active material), then dried and compressed, and at this time, the drying was performed under controlled or selected conditions in order to obtain a concentration gradient in which an amount of Si was increased (e.g., gradually increased) in a direction from the second region to the first region, thereby preparing a negative active material layer with a concentration gradient.

Herein, the concentration gradient was such that the amount of Si was increased by 6 wt % of the amount of Si for each region corresponding to about a 25% thickness in a direction from the outermost of the second region to the first region, and the amount of Si presented in the first region was 5 times higher than the amount of Si presented in the second region.

A half-cell was fabricated by substantially the same procedure as in Example 1, except that the negative electrode of Example 2 was utilized.

Comparative Example 1

Artificial graphite at 82.5 wt %, a Si-based material at 15 wt %, carboxymethyl cellulose at 1.0 wt % and styrene-butadiene rubber at 1.5 wt % were mixed in pure water to prepare a first negative active material layer slurry. Herein, a Si-carbon composite including a core including artificial graphite and silicon particles and a soft carbon coated on the core was utilized as the Si-based material. The soft carbon coating layer had a thickness of about 20 nm, and the silicon particles had an average particle diameter D50 of about 100 nm.

Artificial graphite at 82.5 wt %, a Si-based material at 15 wt %, carboxymethyl cellulose at 1.0 wt % and styrene-butadiene rubber at 1.5 wt % (e.g., the same composition as the first negative active material layer slurry) were mixed in pure water to prepare a second negative active material layer slurry. Herein, a Si-carbon composite including a core including artificial graphite and silicon particles and a soft carbon coated on the core was utilized as the Si-based material. The soft carbon coating layer had a thickness of about 20 nm, and the silicon particles had an average particle diameter D50 of about 100 nm.

The first negative active material layer slurry and the second negative active material layer slurry were simultaneously coated on a Cu foil current collector (e.g., the first negative active material layer composition was coated on the Cu foil and the second negative active material layer slurry was coated on the first negative active material), then dried and compressed to prepare a negative active material layer, and to finally fabricate a negative electrode. In the negative active material layer, a region which corresponded to about 50% based on the total thickness of the negative active material layer, adjacent to the current collector, was classified as a first region, and another region which corresponded to the remaining 50%, not adjacent to the current collector, was classified as a second region. In the negative active material layer, the amount of Si presented in the first region was each independently the same as the amount of Si presented in the second region.

A half-cell was fabricated by each independently the same procedure as in Example 1, except that the negative electrode was utilized.

Experimental Example 1

Cycle-Life Characteristics at Room Temperature Evaluation

The half-cells according to Examples 1 and 2, and Comparative Example 1 were 0.5 C charged and 0.5 C discharged at 25° C. 200 times. The discharge capacity ratio of the $200^{th}$ discharge capacity to the $1^{st}$ discharge capacity was calculated. The result is shown in FIG. 3.

Figure 3:
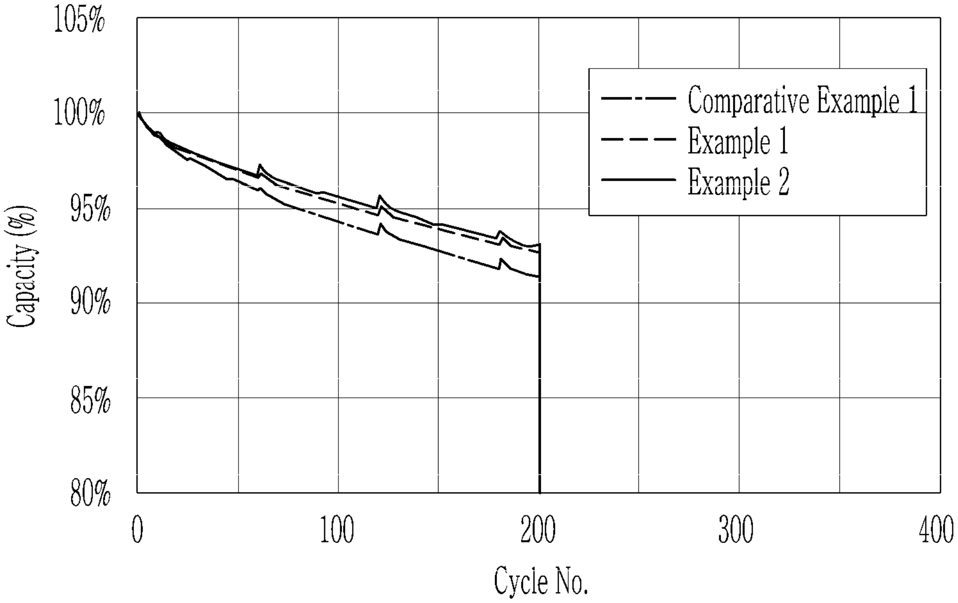
FIG. 3 is a graph showing room temperature cycle-life characteristics of half-cells according to Examples 1 and 2, and Comparative Example 1.

As shown in FIG. 3, the negative active material layers of each half-cell included the first region adjacent to the current collector, and the second region not adjacent to the current collector, and when the amount of Si presented in the first region was 2 times or 5 times larger than that of the Si presented in the second region (e.g., as in Examples 1 and 2), the cycle-life characteristics at room temperature was excellent or suitable.

Experimental Example 2

Cycle-Life Characteristics at High Temperature Evaluation

Half-cells according to Examples 1 and 2 and Comparative Example 1 were 0.5 C charged and 0.5 C discharged at 45° C. 200 times. The discharge capacity ratio of the $200^{th}$ discharge capacity to the $1^{st}$ discharge capacity was calculated. The result is shown in FIG. 4.

Figure 4:
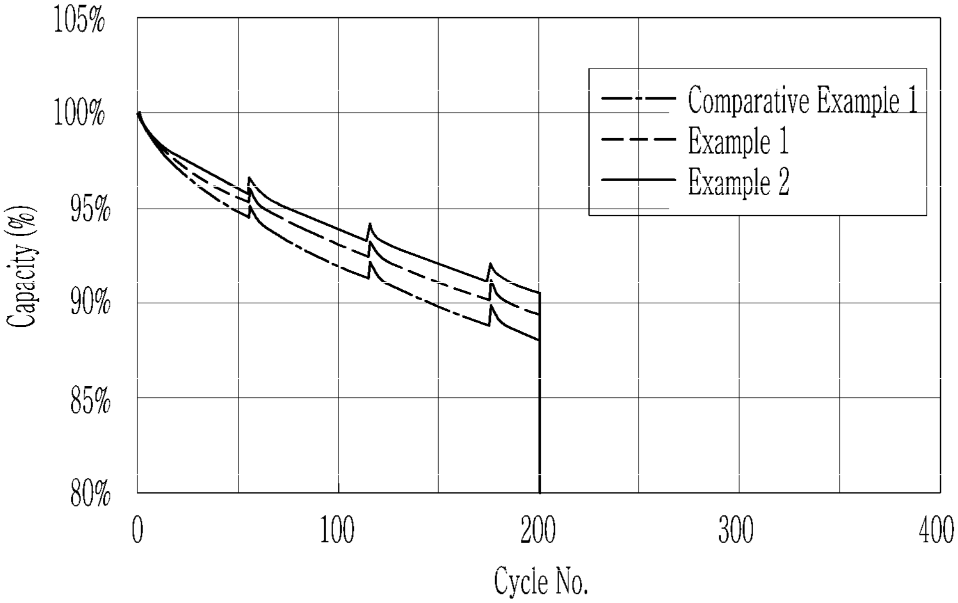
FIG. 4 is a graph showing high temperature cycle-life characteristics of half-cells according to Examples 1 and 2, and Comparative Example 1.

As shown in FIG. 4, the negative active material layer included the first region adjacent to the current collector, and the second region not adjacent to the current collector, and when the amount of Si presented in the first region was 2 times or 5 times larger than that of the Si presented in the second region (e.g., as in Examples 1 and 2), the cycle-life characteristics at a high temperature were excellent or desirable.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this present disclosure has been described in connection with what is presently considered to be practical embodiments, it is to be understood that the present disclosure is not limited to the disclosed embodiments. On the contrary, it is intended to cover one or more suitable modifications and equivalent arrangements included within the spirit and scope of the appended claims.

What is claimed is:

1. A negative electrode for a rechargeable lithium battery, the negative electrode comprising:

a current collector; and a negative active material layer on the current collector, wherein the negative active material layer consists of a first region adjacent to the current collector and a second region not in contact with the current collector, wherein the negative active material layer comprises a carbonaceous material and a Si-based material, the Si-based material comprising Si particles comprising Si, and an amount of the Si in the negative active material layer is different in the first region and the second region;

wherein the Si particles have an average particle size (D50) of at most about 150 nm;

wherein the Si-based material comprises a composite comprising the Si particles and a first carbon-based material and is in an amount of about 14 wt % to about 25 wt % in the first region relative to a total amount of the first region; and wherein the amount of the Si in the negative active material layer increases by about 5% to about 8% for each region corresponding to a thickness of the negative active material layer of about 25% in a direction from an outermost edge of the second region toward the first region.

2. The negative electrode of claim 1, wherein the Si is present with a concentration gradient increasing from the second region to the first region.

3. The negative electrode of claim 1, wherein an amount of the Si in the first region is about 2 times to about 25 times an amount of the Si in the second region.

4. The negative electrode of claim 1, wherein the carbonaceous material is crystalline carbon.

5. The negative electrode of claim 4, wherein the crystalline carbon is artificial graphite, natural graphite, or a combination thereof.

6. The negative electrode of claim 1, wherein the Si-based material comprises a core in which the Si particles and a second carbon-based material are mixed, and a third carbon-based material is around the core.

7. The negative electrode of claim 1, wherein the first region is a region corresponding to about 1% to about 75% of a total thickness of the negative active material layer.

8. A rechargeable lithium battery, comprising:

the negative electrode of claim 1;

a positive electrode; and an electrolyte.

9. The rechargeable lithium battery of claim 8, wherein the Si is present with a concentration gradient increasing from the second region to the first region.

10. The rechargeable lithium battery of claim 8, wherein an amount of the Si in the first region is about 2 times to about 25 times an amount of the Si in the second region.

11. The rechargeable lithium battery of claim 8, wherein the carbonaceous material is crystalline carbon.

12. The rechargeable lithium battery of claim 11, wherein the crystalline carbon is artificial graphite, natural graphite, or a combination thereof.

13. The rechargeable lithium battery of claim 8, wherein the Si-based material comprises a core in which the Si particles and a second carbon-based material are mixed, and a third carbon-based material around the core.

14. The rechargeable lithium battery of claim 8, wherein the first region is a region corresponding to about 1% to about 75% of a total thickness of the negative active material layer.

15. The negative electrode of claim 1, wherein the average particle size (D50) of the Si particles is about 20 nm or more.

16. A negative electrode for a rechargeable lithium battery, the negative electrode comprising:

a current collector; and a negative active material layer on the current collector, wherein the negative active material layer comprises a first region adjacent to the current collector and a second region not in contact with the current collector, wherein the negative active material layer comprises a carbonaceous material and a Si-based material, the Si-based material comprising a composite of Si particles and a first carbon-based material, the Si particles comprising Si, wherein an amount of the Si in the negative active material layer is different in the first region and the second region; and wherein the amount of the Si in the negative active material layer increases by about 5% to about 8% for each region corresponding to a thickness of the negative active material layer of about 25% in a direction from an outermost edge of the second region toward the first region.

* * * * *